United States Patent
Haigis et al.

(10) Patent No.: US 12,050,123 B2
(45) Date of Patent: Jul. 30, 2024

(54) SCALE WITH LABEL PRINTER (71) Applicant: Bizerba SE & Co. KG, Balingen (DE)

(72) Inventors: Joerg Haigis, Balingen (DE); Moritz Dehner, Hechingen-Stetten (DE)

(73) Assignee: Bizerba SE & Co. KG, Balingen (DE)

( * ) Notice: Subject to any disclaimer, the term of this patent is extended or adjusted under 35 U.S.C. 154(b) by 374 days.

(21) Appl. No.: 17/372,859

(22) Filed: Jul. 12, 2021

(65) Prior Publication Data
US 2022/0018706 A1  Jan. 20, 2022

(30) Foreign Application Priority Data
Jul. 20, 2020 (EP) .................................... 20186791

(51) Int. Cl.
*G01G 23/38* (2006.01)
*B41J 3/407* (2006.01)
*G01G 21/28* (2006.01)

(52) U.S. Cl.
CPC ............ *G01G 23/38* (2013.01); *B41J 3/4075* (2013.01); *G01G 21/28* (2013.01)

(58) Field of Classification Search
CPC .... G01G 23/38; G01G 21/28; G01G 19/4144; B41J 3/4075
USPC .......................................................... 177/2
See application file for complete search history.

(56) References Cited

U.S. PATENT DOCUMENTS

| | | | | | |
|---|---|---|---|---|---|
| 4,101,366 | A | * | 7/1978 | Teraoka | B65C 11/02 177/12 |
| 4,301,878 | A | * | 11/1981 | Soe | G01G 23/42 705/414 |
| 9,091,587 | B2 | * | 7/2015 | Kawamura | G01G 21/28 |
| 9,417,045 | B2 | * | 8/2016 | Sugamata | G01D 5/34707 |
| 10,107,674 | B2 | * | 10/2018 | Mamich | G01G 21/22 |
| 11,209,305 | B2 | * | 12/2021 | Sato | G01G 21/28 |
| 2003/0146966 | A1 | * | 8/2003 | Fisher | B41J 3/4075 347/188 |

FOREIGN PATENT DOCUMENTS

| | | | |
|---|---|---|---|
| EP | 2 594 911 A2 | | 5/2013 |
| GB | 2471846 | * | 1/2011 |

OTHER PUBLICATIONS

European Search Report dated Jan. 27, 2021 of corresponding European Patent Application No. 20186791.8 (three pages).

* cited by examiner

*Primary Examiner* — Jacques M Saint Surin
(74) *Attorney, Agent, or Firm* — Kilpatrick Townsend & Stockton LLP (57) ABSTRACT

The invention relates to a scale, in particular to a store scale, comprising a scale platform including a load cell integrated therein, a label printer unit, and a plastic housing unit, wherein the scale platform, the label printer unit, and the plastic housing unit are each configured as a module, and wherein the label printer unit and the plastic housing unit are arranged disposed laterally next to one another and together form a substructure for the scale platform that is placed on both the label printer unit and the plastic housing unit.

25 Claims, 8 Drawing Sheets

SCALE WITH LABEL PRINTER

This application claims priority to European Patent Application 20186791.8, filed on Jul. 20, 2020, the disclosure of which is incorporated by reference herein.

The invention relates to a scale, in particular to a store scale, that is equipped with a label printer.

It is known in such scales, within the framework of a model series, either to accommodate the label printer together with the load cell of the scale and the associated electronics in a housing of the scale that has a high design—due to the label printer—or to use a housing of a flat design for the load cell and the associated electronics and to attach the label printer to a stand to which a customer display and/or an operator display is fastened. Since the two variants differ considerably from one another in their design, components developed for the one variant cannot be easily used for the other variant so that the development and production are cost-intensive.

It is the underlying object of the invention to provide a scale, in particular a store scale, that promotes an inexpensive development of a model series.

This object is satisfied by a scale, in particular a store scale, having the features of claim 1, and in particular by a scale, in particular a store scale, comprising a scale platform including a load cell integrated therein, in particular together with electronics for operating the scale, a label printer unit, and a plastic housing unit, wherein the scale platform, the label printer unit, and the plastic housing unit are each configured as a module, and wherein the label printer unit and the plastic housing unit are arranged disposed laterally next to one another and together form a substructure for the scale platform that is placed on both the label printer unit and the plastic housing unit.

The scale in accordance with the invention overall corresponds to a variant with a housing of a high design. The scale platform alone can, in contrast, have a housing of a flat design. Due to their modularity, the scale platform, the label printer unit, and the plastic housing unit are assembled along defined points. The scale platform can therefore also be easily used in a variant in which the label printer is attached to a stand for a customer display and/or an operator display. The development costs for a model series can hereby be reduced. The plastic housing unit, which can be manufactured inexpensively and which is ultimately only there for the purpose of, in the variant of a high design, compensating the overall height of the label printer unit arranged below the one side of the scale platform and supporting the other side of the scale platform in order to ensure a horizontal assembly of the scale, can be omitted for the variant of a small design. The label printer units of the two variants can be the same or can be different from one another.

The scale, in particular a store scale, in particular has a display unit for an operator and/or a display unit for a customer. An adapter unit can be provided via which the display unit for an operator and/or the display unit for a customer is/are fastened to the scale platform. Provision can be made that the label printer unit and the plastic housing unit are only indirectly, via the scale platform, fixedly connected to one another. Furthermore, the label printer unit and the plastic housing unit can each be provided with two adjustable feet, in particular exactly two adjustable feet, that are vertically adjustable. The electronics for operating the scale in particular comprise an evaluation unit, which is adapted to convert a weighing signal of the load cell into a weight, and in particular a control unit that is adapted to control the display unit for an operator and/or the display unit for a customer and the label printer unit to display the weight together with an associated price on the display unit for an operator and/or on the display unit for a customer and to print the weight together with an associated price onto a label of a label tape inserted into the label printer unit.

The plastic housing unit preferably has an outer housing wall that runs around at least in part, in particular at three sides or at least at three sides, and a housing base, with a stiffening structure, which stiffens the outer housing wall from the inside, being provided in the interior of the plastic housing unit. As explained above, the plastic housing unit only has the purpose of forming a part of the substructure for the scale platform, which part, however, preferably should be formed as light as possible and should be inexpensive. This can be achieved by an outer housing wall having only a small wall thickness. In order nevertheless to be able to guarantee a sufficient component stiffness in this respect, the aforementioned stiffening structure can be provided.

In accordance with a preferred embodiment, the stiffening structure has two supports that each extend vertically upwardly from the housing base, with the outer housing wall, the housing base, and the supports being formed in one piece as a common injection molded part, and with the two supports each being spaced apart from the outer housing wall and holding, in particular fixedly holding, a separately formed strut, in particular a flat strut, that is in particular composed of plastic and that contacts the outer housing wall at the inside. The manufacture by an injection molding process is inexpensive. To increase the component stiffness, it is known with injection molded parts to provide stiffening ribs at the walls, with the stiffening ribs, however, representing an accumulation of material such that an increased volume contraction occurs there on the cooling of the melt. This can become noticeable in a phenomenon known as a showing through of the ribs at the oppositely disposed surface, which is frequently viewed as a quality defect. By using a separate component in the form of a strut, which contacts the outer housing wall from the inside, such a showing through can be avoided.

To achieve a particularly effective stiffening of the outer housing wall, the strut can extend in a horizontal direction and/or the strut can be arranged in the region of the upper half, preferably the upper 30%, particularly preferably the upper 10%, of the height of the outer housing wall. Alternatively or additionally, the strut, over its total longitudinal extent or at least 80% thereof, in particular with a straight edge, can contact a side, in particular a planar side, of the outer housing wall. Provision can furthermore be made that the strut extends in a peripheral direction of the outer housing wall along a side of the outer housing wall, with the length of the strut having a value that amounts to at least 50%, in particular at least 70%, of the dimension of the side in the peripheral direction.

Provision is preferably made that the supports each have a plateau at their free ends, on which plateau the strut, in particular with one of its flat sides, is disposed. The plateaus are easily accessible for an assembly of the strut. It can furthermore hereby be achieved that the strut is arranged as far as possible away from the housing base, whereby a particularly effective stiffening of the outer housing wall can be achieved.

For a particularly secure holding of the strut at the supports, the strut can be fastened to the supports via a pin connection in each case, with the strut for this purpose having a respective fastening hole at its two ends and the supports each having a pin at their free ends, said pin projecting from the respective plateau in the direction of the longitudinal extent of the supports and engaging into a respective fastening hole of the strut, in particular in a form-fitted and/or force-fitted manner.

In this respect, the respective fastening hole can have a plurality of inwardly projecting clamping sections, with preferably the respective pin having a cross-section that differs from a circular shape in a section that cooperates with a longer one of the clamping sections. The respective holding force between the strut and the respective support, and in particular the position of the strut relative to the outer housing wall, can be precisely predefined via the clamping sections and can, if necessary, be easily adapted in the case of an only slight change to the underlying injection mold. The pins are preferably each arranged off-center at the plateaus, arranged offset in the direction of the section of the outer housing wall which the strut contacts. The strut can hereby be moved closer to the outer housing wall so that the width of the strut can be kept small.

Furthermore, it is preferred if a nut, via which the scale platform is screwed to the plastic housing unit, is embedded in the free end of the respective pin. Due to the injection of the nuts, the possibility of the screwing of the scale platform to the plastic housing unit can be provided in a simple way.

The cross-section of the supports can in each case taper in the direction of the free end. This is in particular of advantage in the injection molding process in a technical production respect.

In accordance with a further preferred embodiment, at least four such supports and at least two such struts are provided, with the two struts each contacting the outer housing wall at two mutually oppositely disposed sides of the plastic housing unit. The outer housing wall can thus be stiffened not only at one side of the plastic housing unit, but at two mutually oppositely disposed sides, whereby the stiffness of the plastic housing unit increases overall.

Furthermore, provision can be made that the plastic housing unit has a partly high inner wall structure, in particular a grid-like inner wall structure, at the inside of the housing base to stiffen the housing base. Different designs of the inner wall structure are conceivable here.

Further advantageous embodiments of the invention are described in the dependent claims, in the description of the Figures, and in the drawing. The invention will be described in the following by way of example with reference to the drawing. There are shown FIG. 1A, B two variants of a scale, in particular of a store scale, in accordance with the prior art in a schematic representation;

Figure 1A:
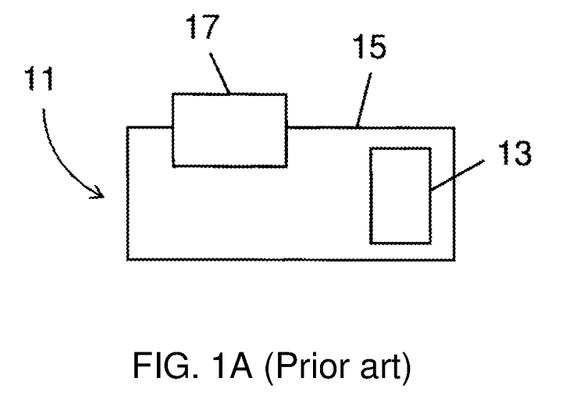
Figure 1B:
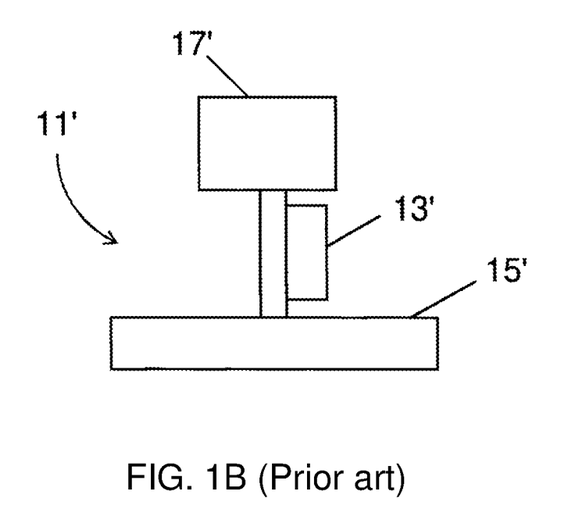

Two variants of a known scale 11, 11', in particular of a store scale, of a model series are shown schematically in FIG. 1. In the variant in accordance with FIG. 1A, a label printer 13 is integrated in a housing 15 of a high design of the scale 11 in which the load cell and the scale electronics are also accommodated. Furthermore, at least one display unit 17 for an operator and/or a customer is attached to the housing 15. In the variant in accordance with FIG. 1B, only a housing 15' of a flat design is provided for the load cell and the electronics, and a label printer 13' is fastened to a stand for a customer and/or operator display 17'. The two variants do not have any identical parts.

Figure 2A:
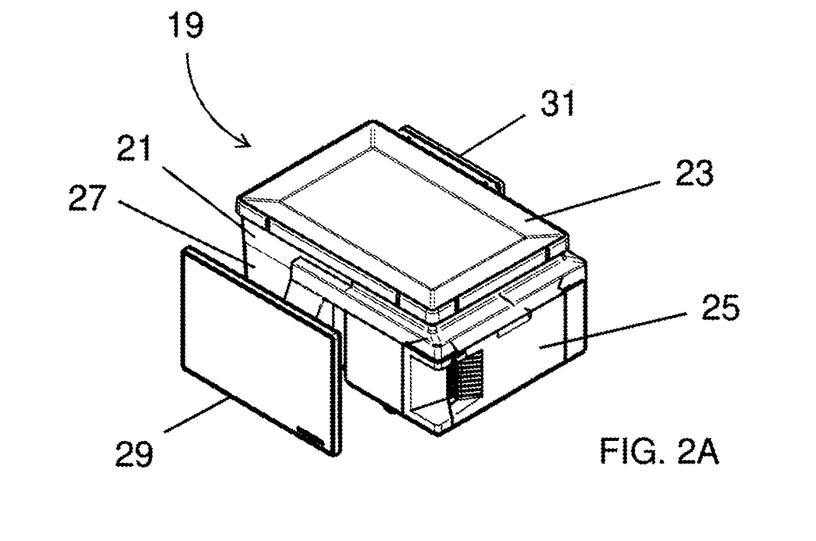
FIG. 2A, B a scale in accordance with the invention, in particular a store scale, and a variant thereof not in accordance with the invention, FIG. 3A, B the two scales in accordance with FIGS. 2A and 2B, in each case in an exploded representation in a rear view.
Figure 3A:
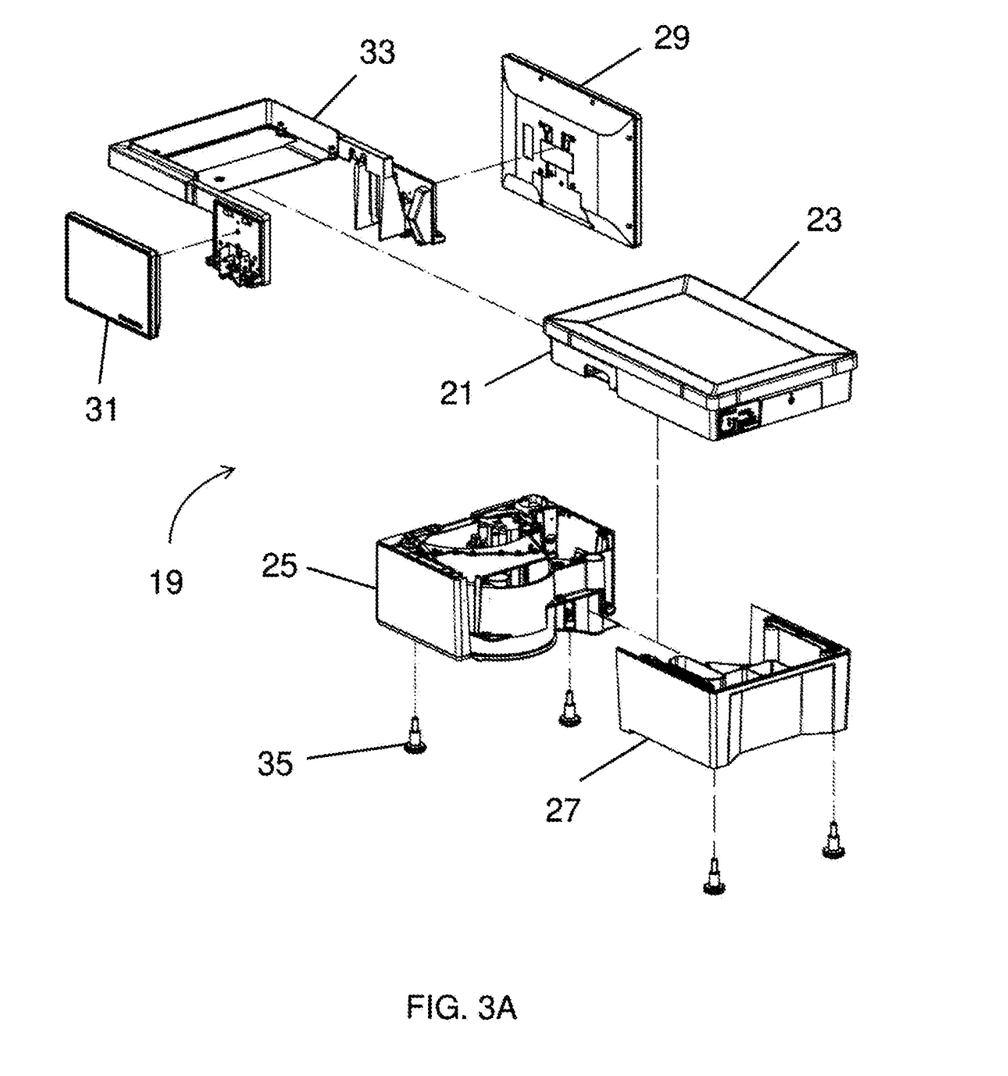

A scale 19 in accordance with the invention, in particular a store scale, is shown in FIGS. 2A and 3A. The scale 19 comprises a scale platform 21 having a load plate 23, a label printer unit 25, a plastic housing unit 27, a display unit 29 for an operator, a display unit 31 for a customer, and an adapter unit 33 to attach the two display units 29, 31 to the scale platform 21. The scale platform 21, in which the load cell and the electronics for operating the scale 11, i.e. evaluation electronics for the weighing signal of the load cell and a control unit for controlling the label printer unit 25 and the two display units 29, 31, are integrated, the label printer unit 25 and the plastic housing unit 27 as well as the two display units 29, 31 are each configured as a module. The label printer unit 25 and the plastic housing unit 27 are in this respect arranged disposed laterally next to one another. The label printer unit 25 and the plastic housing unit 27 are not directly fixedly connected to one another, but are each screwed to the scale platform 21.

The label printer unit 25 and the plastic housing unit 27 together form a substructure on which the scale platform 21 is placed. In this respect, the scale platform 21 is disposed in part on the label printer unit 25 and in part on the plastic housing unit 27. The label printer unit 25 is arranged beneath the scale platform 21. Two adjustable feet 35 are in each case screwed into the label printer unit 25 and the plastic housing unit 27 to be able to horizontally align the scale 19.

Figure 2B:
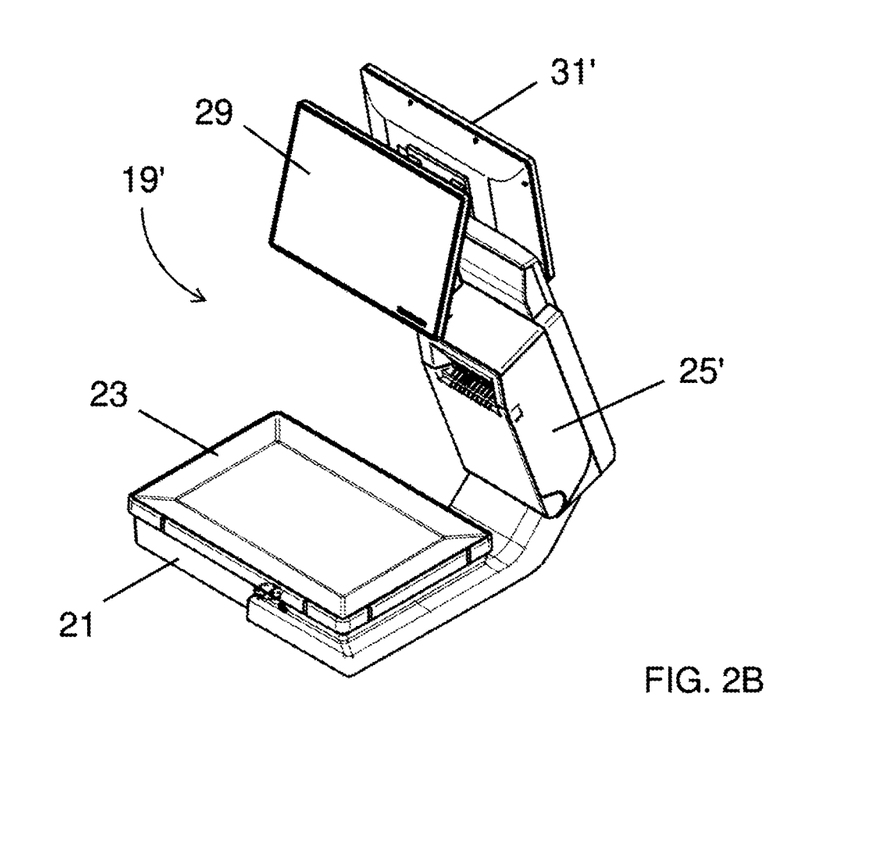
Figure 3B:
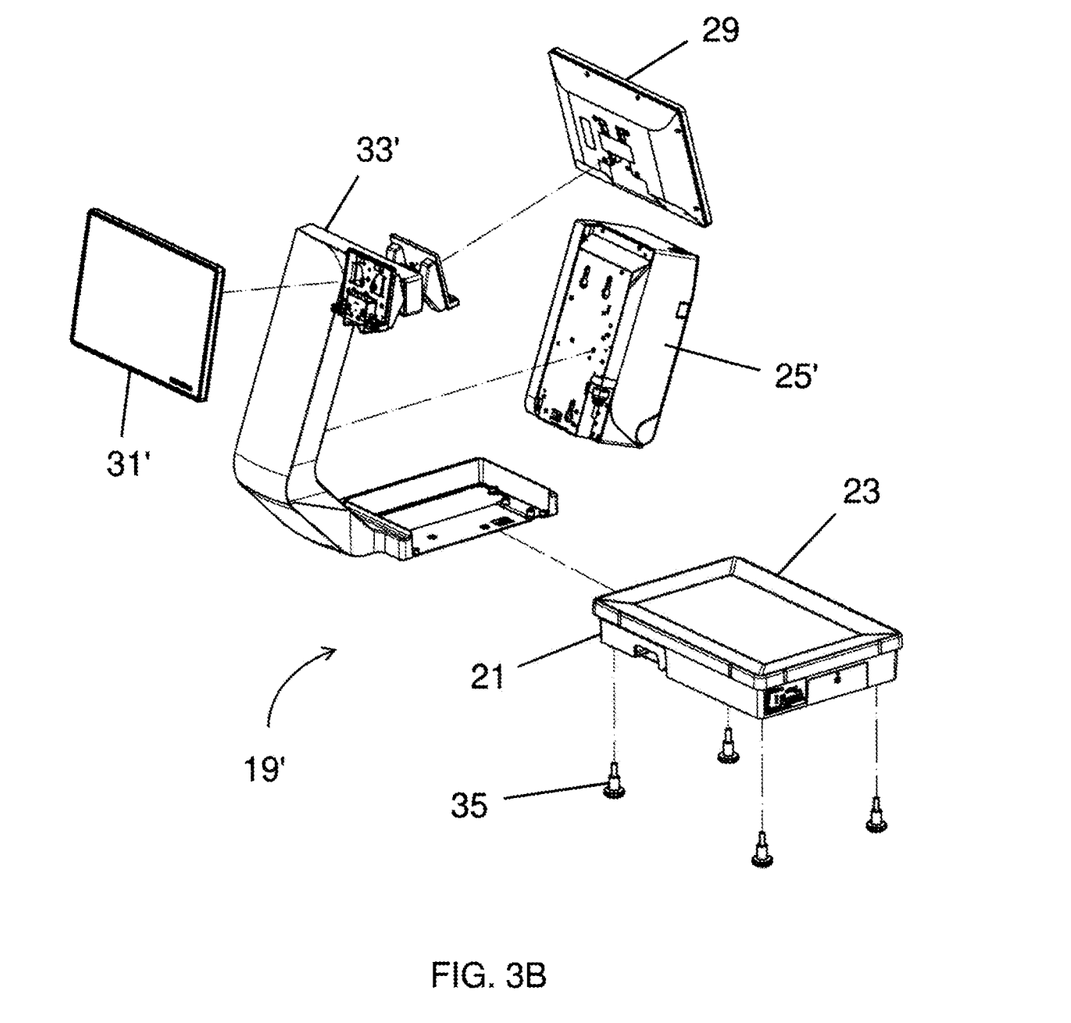

The scale platform 21 of the scale 19 can be used unchanged in one variant of the scale 19, and indeed in the scale 19' shown in FIGS. 2B and 3B. A label printer unit 25' is in this respect arranged above the scale platform 21, at a stand. In this respect, the stand forms an adapter unit 33' via which the two display units 29, 31' are attached to the scale platform 21. In this variant, the adjustable feet 35 are screwed directly into the scale platform 21. The scale platform 21 can thus be used as a common part for both scale variants 19, 19'. In another respect, this also applies to the two display units 29, 31, wherein, in the embodiment shown, only the display unit 29 for an operator is the same, but the display unit 31' for a customer is slightly larger.

Figure 4:
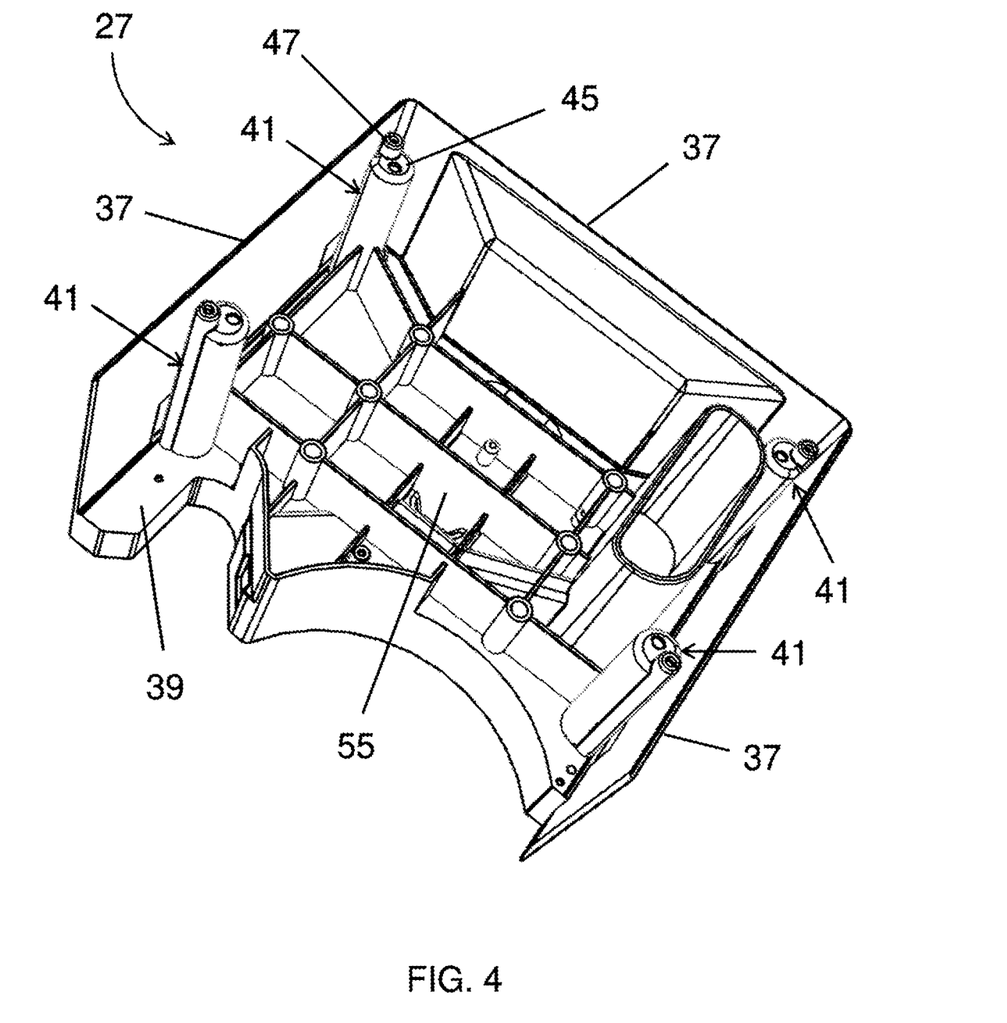
FIG. 4 a plastic housing unit of the scale in accordance with FIG. 2A in an individual representation (without struts) in a perspective view.
Figure 5A:
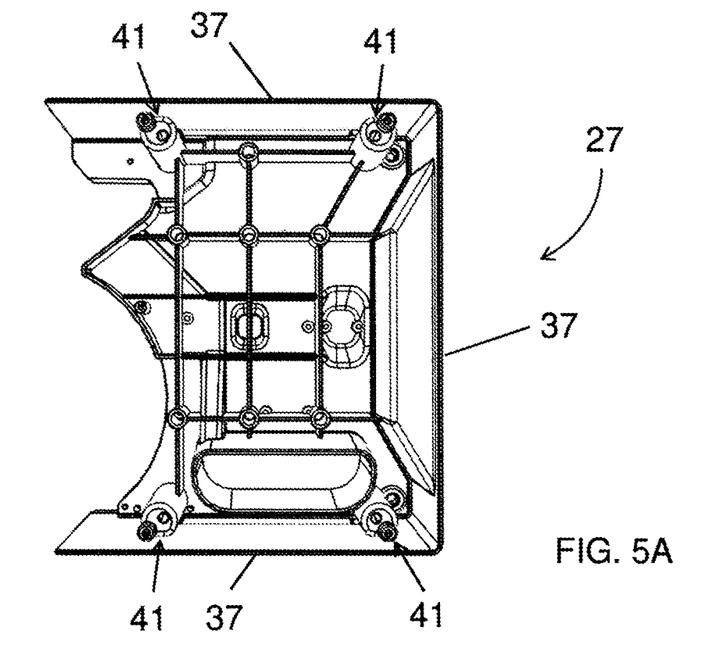
FIGS. 5A, B the plastic housing unit in accordance with FIG. 4 with and without struts, in each case in a plan view, FIGS. 6A, B an enlarged representation of the plastic housing unit in accordance with FIGS. 5A and 5B in the region of a support.
Figure 5B:
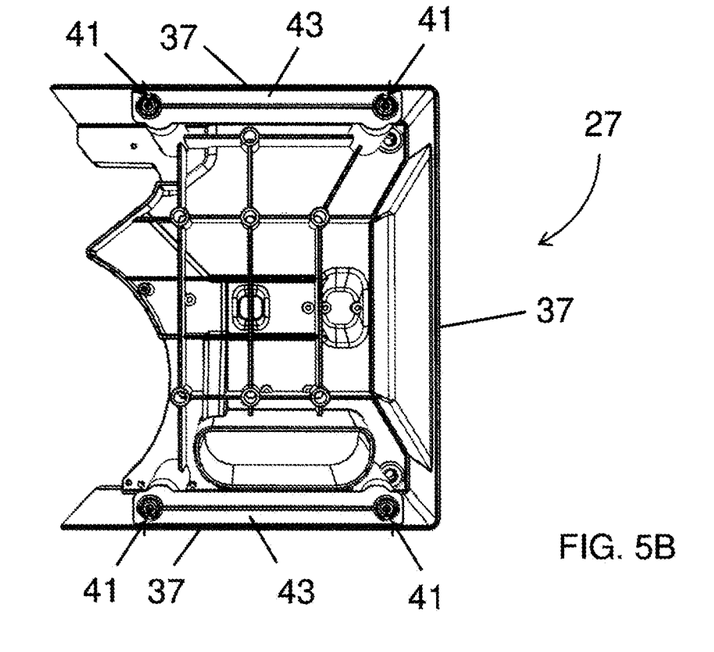

As can be seen from FIGS. 4, 5A, and 5B, the plastic housing unit 27 of the scale 19 has an outer housing wall 37 that runs around at three sides and a housing base 39, wherein the three sides of the outer housing wall 37 are each planar and slightly tilted against the vertical. In the embodiment shown, the height of the outer housing wall 37 amounts to approximately 12 cm viewed from the outside and to approximately 10 cm viewed from the inside. Since the outer housing wall 37 only has a small wall thickness of approximately 3 mm for cost and weight reasons, a stiffening structure, which stiffens the outer housing wall 37 from the inside, is provided in the interior of the plastic housing unit 27.

Figure 6A:
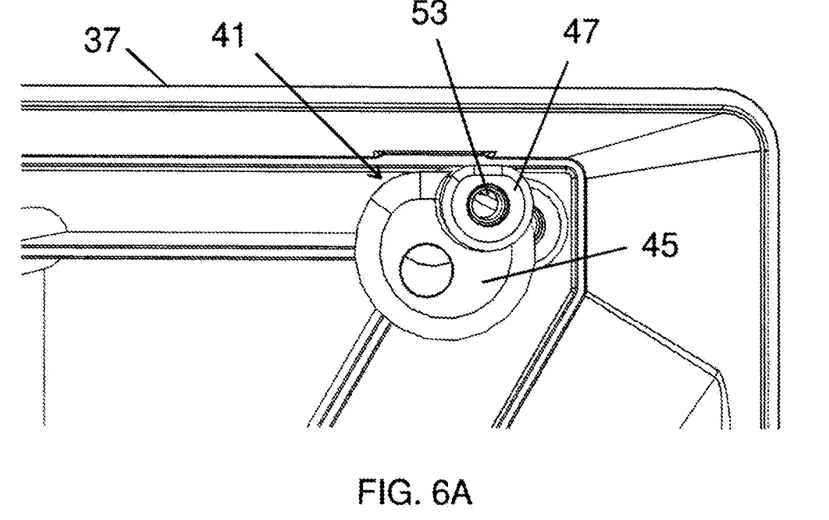

At two mutually oppositely sides of the plastic housing unit 27, the stiffening structure in each case comprises two supports 41 that extend vertically upwardly from the housing base 39 and that are each arranged inwardly spaced apart from the outer housing wall 37 (cf. FIGS. 6A, 7A, and 7B) and whose cross-sections in each case taper in the direction of the free end (cf. FIGS. 7A and 7B) such that the spacing d between the supports 41 and the outer housing wall increases slightly from the bottom to the top. In the embodiment shown, the spacing d amounts to approximately 2 mm at the bottom and approximately 6 mm at the top. The supports 41 together with the outer housing wall 37 and the housing base 39 form a single-piece injection molded part. In this respect, the two supports 41 at a respective side of the plastic housing unit 27 each hold a separately formed, flat strut 43 composed of plastic. The struts 43, in each case over their total length and with a straight edge, contact the outer housing wall 37 at the inside, and thus in a stiffening manner (cf. FIGS. 5B, 6B, and 7B). A showing through of the stiffening structure, as can be the case with injection-molded stiffening ribs, can thus be ruled out.

The free ends of the supports 41 are each formed as a plateau 45 on which the struts 43 are disposed with their flat sides. The plateaus 45 lie approximately 9 cm above the housing base 39. A pin 47, which is approximately 1 cm in length and which projects into a respective fastening hole 49 formed in the respective strut 43, in each case projects from the plateau 45 in the direction of the longitudinal extent of the support 41 in order to fasten the struts 43 to the supports 41. To achieve a form-fitted and force-fitted connection, the fastening hole 49 has three inwardly projecting clamping sections 51. One of the clamping sections 51 is slightly longer in comparison with the other two clamping sections 51. The pin 47 additionally has a non-circular cross-section having a flattened portion with which the longer clamping section 51 cooperates. The holding force and the position of the strut 43 relative to the outer housing wall 37 can hereby be precisely predefined.

The pins 47 each project off-center from the plateaus 45. In this respect, the pins 47 are arranged offset in the direction of the respective section of the outer housing wall 37 which the respective strut 43 contacts. A nut 53, via which the scale platform 21 can be screwed to the plastic housing unit 27, is in each case embedded in the pins 47. The position of the screw fastenings between the scale platform 21 and the plastic housing unit 27 can be predefined by the position of the pins 47.

Figure 6B:
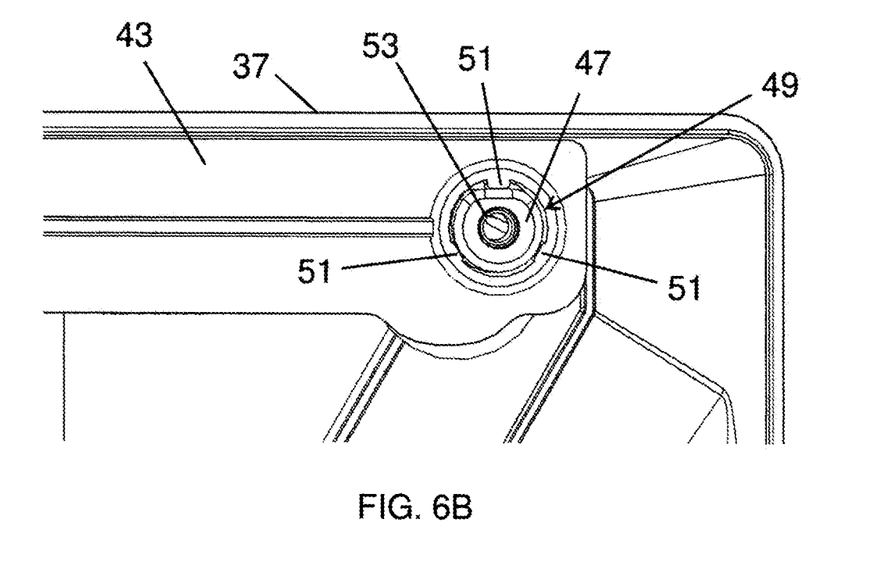
Figure 7A:
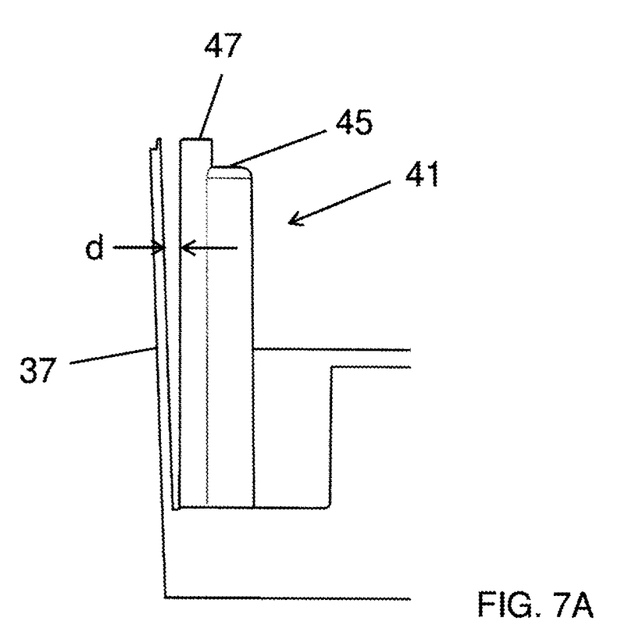
FIGS. 7A, B the support in accordance with FIGS. 6A and 6B in a side view.
Figure 7B:
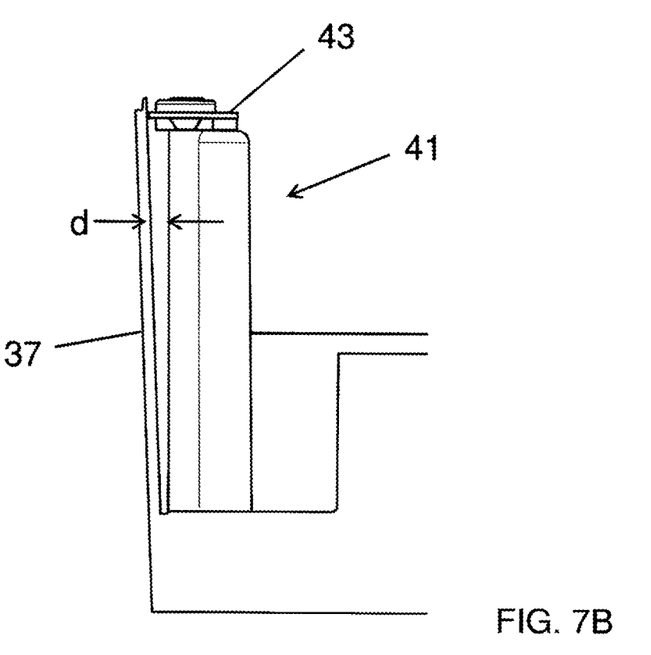

As can be seen from FIGS. 5B, 6B, and 7B, the two struts 43 each extend in the horizontal direction in the peripheral direction along one of the two mutually oppositely disposed sides of the plastic housing unit 27. In this respect, the two struts 43 are located at the upper end of the outer housing wall 37, wherein the struts 43 each extend over more than 50% of the dimension of the respective side of the outer housing wall 37 in the peripheral direction. A good stiffening of the outer housing wall 37 can be achieved by this design.

The plastic housing unit 27 furthermore has an inner wall structure 55 at the inside of the housing base 39 to stiffen the housing base 39. The inner wall structure 55 comprises longitudinally and transversely extending inner walls that are, however, only partly high, i.e. that have a smaller height compared to the outer housing wall 37.

REFERENCE NUMERAL LIST 11, 11' scale
13 label printer
15, 15' housing
17 17' display unit
19, 19' scale
21 scale platform
23 load plate
25 25' label printer unit
27 plastic housing unit
29 display unit
31, 31' display unit
33, 33' adapter unit
35 adjustable foot
37 outer housing wall
39 housing base
41 support
43 strut
45 plateau
47 pin
49 fastening hole
51 clamping section
53 nut
55 inner wall structure
d spacing

The invention claimed is:

1. A scale, comprising a scale platform including a load cell integrated therein, a label printer unit, and a plastic housing unit,
 wherein the scale platform, the label printer unit, and the plastic housing unit are each configured as a module, and
 wherein the label printer unit and the plastic housing unit are arranged disposed laterally next to one another and together form a substructure for the scale platform that is placed on both the label printer unit and the plastic housing unit, wherein the plastic housing unit has an outer housing wall that runs around at least in part, and a housing base, with a stiffening structure, which stiffens the outer housing wall from the inside, being provided in the interior of the plastic housing unit, wherein the stiffening structure has two supports that each extend vertically upwardly from the housing base, with the outer housing wall, the housing base, and the supports being formed in one piece as a common injection molded part, and with the two supports each being spaced apart from the outer housing wall and holding a separately formed strut that contacts the outer housing wall at the inside.

2. The scale in accordance with claim 1,
 wherein the strut extends in a horizontal direction.

3. The scale in accordance with claim 1,
 wherein the strut is arranged in a region of the upper half of the height of the outer housing wall.

4. The scale in accordance with claim 1,
 wherein the strut, over its total longitudinal extent or at least 80% thereof contacts a side, of the outer housing wall.

5. The scale in accordance with claim 1,
 wherein the strut extends in a peripheral direction of the outer housing wall along a side of the outer housing wall, with the length of the strut having a value that amounts to at least 50%, of the dimension of the side in the peripheral direction.

6. The scale in accordance with claim 1,
 wherein the supports each have a plateau at their free ends, on which plateau the strut, is disposed.

7. The scale in accordance with claim 6,
 wherein the strut is fastened to the supports via a pin connection in each case, with the strut for this purpose having a respective fastening hole at its two ends and the supports each having a pin at their free ends, said pin projecting from the respective plateau in the direction of the longitudinal extent of the supports and engaging into a respective fastening hole of the strut.

8. The scale in accordance with claim 7,
wherein the respective fastening hole has a plurality of inwardly projecting clamping sections.

9. The scale in accordance with claim 8,
wherein the respective pin has a cross-section that differs from a circular shape in a section that cooperates with a longer one of the clamping sections.

10. The scale in accordance with claim 7,
wherein the pins are each arranged off-center at the plateaus, arranged offset in the direction of the section of the outer housing wall which the strut contacts.

11. The scale in accordance with claim 7,
wherein a nut, via which the scale platform is screwed to the plastic housing unit, is embedded in the free end of the respective pin.

12. The scale in accordance with claim 7, wherein said pin projecting from the respective plateau in the direction of the longitudinal extent of the supports engages into the respective fastening hole of the strut in a form-fitted and/or force-fitted manner.

13. The scale in accordance with claim 6, wherein the strut is disposed with one of its flat sides on the plateau.

14. The scale in accordance with claim 1,
wherein the supports each have a plateau at their free ends, on which plateau the strut is disposed, and wherein the cross-section of the supports in each case tapers in the direction of the free end.

15. The scale in accordance with claim 1,
wherein at least four such supports and at least two such struts are provided, with the two struts each contacting the outer housing wall at two mutually oppositely disposed sides of the plastic housing unit.

16. The scale in accordance with claim 1,
wherein the plastic housing unit has a partly high inner wall structure, at the inside of the housing base to stiffen the housing base.

17. The scale in accordance with claim 16, wherein the inner wall structure comprises a grid-like inner wall structure.

18. The scale in accordance with claim 1, wherein the scale comprises a store scale.

19. The scale in accordance with claim 1, wherein the strut, over its total longitudinal extent or at least 80% thereof with a straight edge contacts a side of the outer housing wall.

20. The scale in accordance with claim 19, wherein the side of the outer housing wall comprises a planar side of the outer housing wall.

21. The scale in accordance with claim 1, wherein the strut extends in a peripheral direction of the outer housing wall along a side of the outer housing wall, with the length of the strut having a value that amounts to at least 70% of the dimension of the side in the peripheral direction.

22. The scale in accordance with claim 1, wherein the outer housing wall runs around at three sides or at least at three sides, and a housing base.

23. The scale in accordance with claim 22, wherein the strut is a flat strut.

24. The scale in accordance with claim 1, wherein the strut is arranged in the upper 30% of the height of the outer housing wall.

25. The scale in accordance with claim 1, wherein the strut is arranged in the upper 10% of the height of the outer housing wall.

* * * * *